United States Patent
Hirota et al.

(10) Patent No.: US 9,636,865 B2
(45) Date of Patent: May 2, 2017

(54) PARISON SUPPLY DEVICE AND SUPPLY METHOD

(71) Applicant: TOYO SEIKAN GROUP HOLDINGS, LTD., Tokyo (JP)

(72) Inventors: Norihisa Hirota, Kanagawa (JP); Ikuo Komatsu, Kanagawa (JP); Hiromitsu Fukuoka, Kanagawa (JP); Atsushi Yoneda, Kanagawa (JP); Kouichi Narutaki, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 0 days.

(21) Appl. No.: 14/781,461

(22) PCT Filed: Apr. 23, 2014

(86) PCT No.: PCT/JP2014/061374
§ 371 (c)(1),
(2) Date: Sep. 30, 2015

(87) PCT Pub. No.: WO2014/175311
PCT Pub. Date: Oct. 30, 2014

(65) Prior Publication Data
US 2016/0039139 A1    Feb. 11, 2016

(30) Foreign Application Priority Data

Apr. 24, 2013  (JP) .................................. 2013-091829

(51) Int. Cl.
*B29C 49/04*   (2006.01)
*B29C 49/30*   (2006.01)
(Continued)

(52) U.S. Cl.
CPC .......... *B29C 49/4205* (2013.01); *B29C 49/04* (2013.01); *B29C 49/30* (2013.01); *B29C 2049/044* (2013.01); *B29K 2105/258* (2013.01)

(58) Field of Classification Search
CPC .......... B29C 49/4205; B29C 2049/044; B29C 49/30
See application file for complete search history.

(56) References Cited

U.S. PATENT DOCUMENTS

| 4,153,408 A | 5/1979 | Albert et al. |
| 4,233,019 A * | 11/1980 | Sawa .................. B29C 49/4205 264/532 |
| 4,560,340 A * | 12/1985 | Younkin ................. B29C 49/04 264/532 |

FOREIGN PATENT DOCUMENTS

| DE | 1 479 161 | 2/1969 | |
| GB | 1501775 A * | 2/1978 | ............. B29C 49/04 |

(Continued)

OTHER PUBLICATIONS

International Search Report issued Jul. 15, 2014 in International (PCT) Application No. PCT/JP2014/061374, with English translation.

(Continued)

*Primary Examiner* — Robert B Davis
(74) *Attorney, Agent, or Firm* — Wenderoth, Lind & Ponack, L.L.P.

(57) ABSTRACT

A parison supply device that continuously supplies, to a blow molding die, parison sections of a parison discharged from an extrusion die, the parison section having a specified length. The parison supply device includes a plurality of tension chucks and a tension chuck operation unit that operates the plurality of tension chucks. The tension chuck operation unit causes the individual tension chucks to perform a repeated operation of grasping the parison at a first (Continued)

position near the extrusion die and moving to a second position separated from the extrusion die such that, before the preceding tension chuck is separated by a set distance from the extrusion die at the second position, the following tension chuck grasps the parison at the first position, and then the parison section is supplied to the blow molding die.

19 Claims, 6 Drawing Sheets

(51) Int. Cl.
      *B29C 49/42*     (2006.01)
      *B29K 105/00*   (2006.01)

(56) References Cited

FOREIGN PATENT DOCUMENTS

| | | | |
|---|---|---|---|
| JP | 52-100566 | | 8/1977 |
| JP | 52-144060 | | 12/1977 |
| JP | 2000271990 A | * | 10/2000 |
| JP | 2002-79571 | | 3/2002 |
| WO | 81/02133 | | 8/1981 |

OTHER PUBLICATIONS

Extended European Search Report issued Nov. 30, 2016 in corresponding European Application No. 14789117.0.

* cited by examiner

PARISON SUPPLY DEVICE AND SUPPLY METHOD

TECHNICAL FIELD

The present invention relates to a parison supply device and a parison supply method for supplying, in blow molding, a parison discharged from an extrusion die to a blow molding die.

BACKGROUND ART

Extrusion blow molding (direct blow molding) is a process in which a thermoplastic resin is melted by an extrusion molding machine, the melted resin is discharged from an extrusion die (die head) to form a hollow tube-like parison, the parison is pinched between a pair of blow molding dies, and blow air is blown into the parison to form a hollow body.

Since a distal end of a parison in a state of being discharged from an extrusion die is not restricted in the state as it is, an axial shift and a thickness variation may occur due to a lateral vibration. In particular, a parison extruded vertically downward may have a thickness difference in the vertical direction due to a phenomenon that the parison itself is stretched by its own weight (draw-down) or a phenomenon that a diameter of the parison after being discharged from an extrusion die swells (die-swell).

In order to solve such a problem, a technique of pinching a parison discharged from an extrusion die using a chuck or the like has been proposed. Patent Literature 1 discloses a technique in which a parison is pinched by a pair of pinching units, a pinched parison section is cut and separated from a main parison, both pinching units are moved away from the main parison and are separated from each other to stretch the parison section in a vertical direction, and the parison section is inserted into a blow molding die in a state of being pinched by the pinching units.

Moreover, Patent Literature 2 discloses a technique in which a parison extruded from an extruding nozzle is captured by one capturing unit, the capturing unit is moved downward at a velocity greater than an extruding velocity of the parison to pull the parison, the parison in this pulled state is pulled into a molding die disposed below the extruding nozzle, and the parison is captured by another capturing unit disposed above the molding die before the parison section sandwiched by the molding die is separated from the main parison.

RELATED ART LITERATURE

Patent Literature

Patent Literature 1: Japanese Patent Application Laid-open No. S52-100566
Patent Literature 2: Japanese Patent Application Laid-open No. S52-144060

SUMMARY OF THE INVENTION

Technical Problem

In order to improve the productivity of products molded by blow molding, it is necessary to continuously supply parison discharged at a specified extruding velocity from extrusion dies to blow molding dies. Moreover, in order to produce high-quality molded products without quality unevenness, it is necessary to maintain an appropriate state of parisons sequentially supplied to a plurality of blow molding dies. Further, depending on a product, a cut section of a parison supplied to each individual blow molding die may be required to have an appropriate thickness along a longitudinal direction.

In this respect, according to the conventional technique disclosed in Patent Literature 1, the parison is stretched by separating the pair of pinching units from each other after the pair of pinching units have simultaneously pinched the parison. Thus, it is difficult to stretch the parison such that the parison has an approximately uniform thickness along the longitudinal direction thereof, and the thickness near the center of the parison is likely to be smaller than the thicknesses near both ends. Thus, the conventional technique has a problem in that it is practically impossible to supply high-quality parisons having relatively uniform thicknesses to blow molding dies. Moreover, according to the conventional technique disclosed in Patent Literature 1, a pair of pinching units simultaneously pinch a parison, and thus, before one parison is cut, another parison already needs to be pinched by a pair of pinching units in order to continuously supply parisons. Thus, a supply space corresponding to at least one cutting interval is required between a discharge opening of the extrusion die and a cutting region of the parison.

According to the conventional technique disclosed in Patent Literature 2, an extruded parison is captured by one capturing unit, the capturing unit is moved downward to pull the parison and then pull it into the molding die, and the parison is captured by another capturing unit disposed above the molding die before the parison section sandwiched by the molding die is separated from the main parison. Thus, it is possible to shorten the supply space for a parison as compared to a case in which a pair of capturing units simultaneously capture a parison, as disclosed in Patent Literature 1. However, since two capturing units capture the parison at a specified position and the molding dies are switched between each other in a direction orthogonal to the direction of extruding the parison, the parison has to be supplied intermittently. In this manner, according to the conventional technique disclosed in Patent Literature 2, although the parison discharged from the extrusion die can be restricted constantly, since a mold 6 (5) and a capturing jaw 12 (11) are closed simultaneously, it is not possible to supply the parison continuously while maintaining an appropriate tension state constantly (see FIG. 2 of Patent Literature 2).

An object of the present invention is to solve such a problem. That is, an object of the present invention is to continuously supply a parison discharged from an extrusion die at a specified extruding velocity to a blow molding die, maintain an appropriate state of the parison supplied to a plurality of blow molding dies in order to improve the quality of products molded continuously, and supply high-quality parisons by maintaining an appropriate tension state while restricting the parison discharged from the extrusion die constantly.

Solution to Problem

In order to attain the object, the present invention includes at least the following configurations.

A parison supply device that continuously supplies, to a blow molding die, a parison section of a parison discharged from an extrusion die, the parison section having a specified length, the parison supply device including: a plurality of tension chucks grasping the parison and pulling the parison in a discharge direction of the parison between the extrusion die and the tension chuck; and a tension chuck operation unit that operates a plurality of the tension chucks, wherein the tension chuck operation unit causes the individual tension chucks to perform a repeated operation of grasping the parison at a first position near the extrusion die and moving to a second position separated from the extrusion die such that, before a preceding one of the tension chucks is separated by a set distance from the extrusion die at the second position, a following one of the tension chucks grasps the parison at the first position, and then the parison is supplied to the blow molding die.

A parison supply method of continuously supplying, to a blow molding die, a parison section of a parison discharged from an extrusion die, the parison section having a specified length, wherein a plurality of tension chucks grasping the parison and pulling the parison in a discharge direction of the parison between the extrusion die and the tension chuck is included, each of the tension chucks perform a repeated operation of grasping a parison at a first position near the extrusion die and moving to a second position separated from the extrusion die, and, before a preceding one of the tension chucks is separated by a set distance from the extrusion die at the second position, a following one of the tension chucks grasps the parison at the first position, and then the parison is supplied to the blow molding die.

Advantageous Effects of Invention

According to the present invention having such features, it is possible to continuously supply a parison discharged from an extrusion die at a specified extruding velocity to a blow molding die and to improve the quality of products molded continuously by maintaining an appropriate state of the parison supplied to a plurality of blow molding dies. Further, it is possible to supply high-quality parisons by maintaining an appropriate tension state while restricting the parison discharged from the extrusion die constantly.

DESCRIPTION OF EMBODIMENTS

Hereinafter, an embodiment of the present invention will be described with reference to the drawings.

Figures 1A, 1B, 1C:
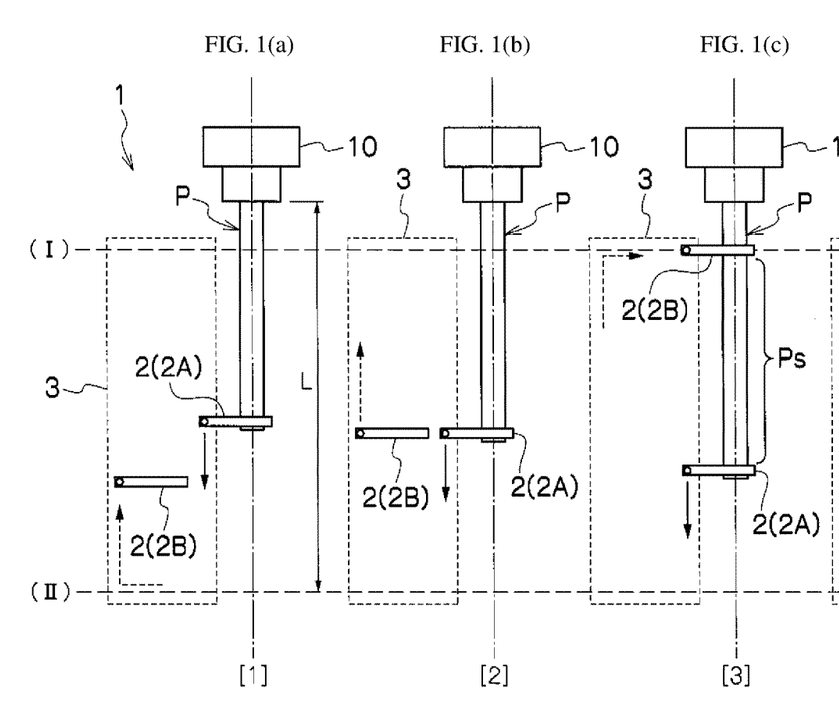
FIGS. 1(a)-1(e) are explanatory diagram diagrams for describing a parison supply device and a parison supply method according to an embodiment of the present invention (an explanatory diagram illustrating a change with time of a discharge state of a parison discharged from an extrusion die and an operation state of a tension chuck).
Figure 1D:
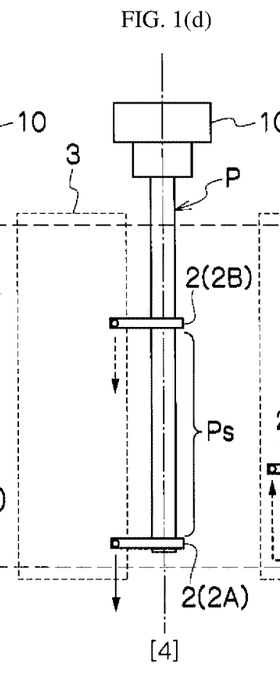
Figure 1E:
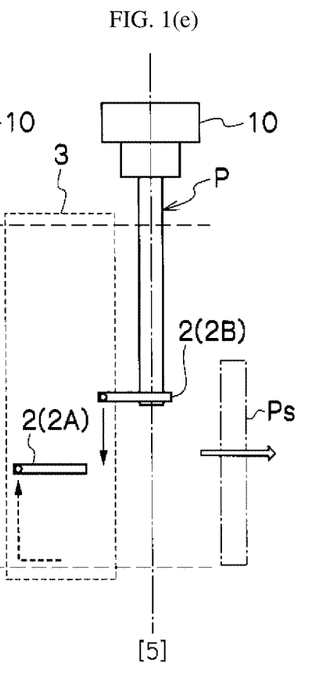

Referring to FIG. 1, a parison supply device 1 is a device that continuously supplies a parison section Ps having a specified length from a parison P discharged from an extrusion die 10 to a blow molding die (not illustrated) and includes a plurality of tension chuck 2 and a tension chuck operation unit 3. In the following description, although an example in which the tension chuck 2 includes two tension chucks 2A and 2B will be described, one parison supply device 1 may include three or more tension chucks 2.

The tension chucks 2A and 2B grasp the parison P to apply tension between the tension chuck and the extrusion die 10. A tensioning direction of the tension chucks 2A and 2B coincides with a discharge direction of the parison P. When the parison P is discharged vertically downward from the extrusion die 10 as illustrated in the drawing, the tension chucks 2A and 2B apply tensile force to the parison P by moving downward while grasping the parison P. An operation of the tension chucks 2A and 2B grasping the parison P may occur simultaneously with or after the start of the movement of the tension chucks 2A and 2B in the discharge direction. Here, by increasing a moving velocity (a relative moving velocity in relation to the extrusion die 10) of the tension chucks 2A and 2B in the discharge direction of the parison P to be faster than a discharging velocity of the parison P, the parison P can be pulled between the extrusion die 10 and the tension chucks 2A and 2B. Here, although the moving velocity of the tension chucks 2A and 2B in the discharge direction may be changed in such a way to gradually increasing or decreasing the moving velocity, it is possible to apply an appropriate tensile rate to the parison P by maintaining the moving velocity to be constant more preferably. When the moving velocity of the tension chucks 2A and 2B is maintained to be constant, the moving velocity may be gradually increased or decreased at the start and the end of the movement in order to realize a smooth operation.

The tension chuck operation unit 3 that operates the plurality of tension chucks 2 maintains a tension state of the parison P discharged from the extrusion die 10 by repeatedly operating the individual tension chucks 2A and 2B at a specified cycle. This tension chuck operation unit 3 performs a repeated operation of allowing the individual tension chucks 2A and 2B to grasp the parison P at a first position (I) near the extrusion die 10 and to move to a second position (II) separated from the extrusion die 10. Here, when a set distance L is defined as a largest distance that the tension chucks 2A and 2B can be separated from an opening end of the extrusion die 10 in the discharge direction of the parison, the set distance L of the present embodiment is the distance between the opening end of the extrusion die 10 to the second position (II) as illustrated in the drawing.

The movement of the tension chucks 2A and 2B in the discharge direction (the downward direction in the drawing) is an operation of restricting the parison P to apply tension thereto, whereas the movement of the tension chucks 2A and 2B in the opposite direction (the upward direction in the drawing) from the discharge direction is a returning operation for releasing the restricted parison P to be prepared for the next tensioning operation. The moving velocity in the returning operation of the tension chucks 2A and 2B can be set to a necessary velocity according to the timing of the next tensioning operation regardless of the moving velocity in the discharge direction (tensioning direction). When a number of (three or more) tension chucks 2 are provided, the moving velocity of the individual returning operation can be decreased as compared to a case where two tension chucks 2 are provided.

The tension chuck operation unit 3 sets the operation timings of the preceding tension chuck 2A (2B) and the following tension chuck 2B (2A). Here, "preceding" means that tension has been already applied to the parison P and "following" means that tension will be applied to the parison P. According to the operation timing set by the tension chuck operation unit 3, the following tension chuck 2B grasps the parison P at the first position (I) before the preceding tension chuck 2A is separated by the set distance L from the extrusion die 10 at the second position (II).

In FIGS. 1(a) to 1(e) illustrate a change in the discharge state of the parison P and the operation of the tension chucks 2A and 2B in a time-sequential order. In the states of FIGS. 1(a) and 1(b), the tension chuck 2A moves in the tensioning direction (discharge direction) while grasping the parison P whereas the tension chuck 2B moves in the returning direction opposite to the tensioning direction without grasping the parison P. In FIG. 1(c), the following tension chuck 2B grasps the parison P at the first position (I) in a state in which the preceding tension chuck 2A continues applying tension.

After the state of FIG. 1(c), as illustrated in FIG. 1(d), the parison P is grasped by the pair of tension chucks 2A and 2B, and a parison section Ps supplied to a blow molding die (not illustrated) is formed between the pair of tension chucks 2A and 2B. After the parison section Ps is cut by a receiving unit (including the blow molding die 4), a cutter (not illustrated), or the like, as illustrated in FIG. 1(e), the following tension chuck 2B moves in the tensioning direction earlier than the tension chuck 2A, and the tension chuck 2A moves in the returning direction via the second position (II).

Figure 2:
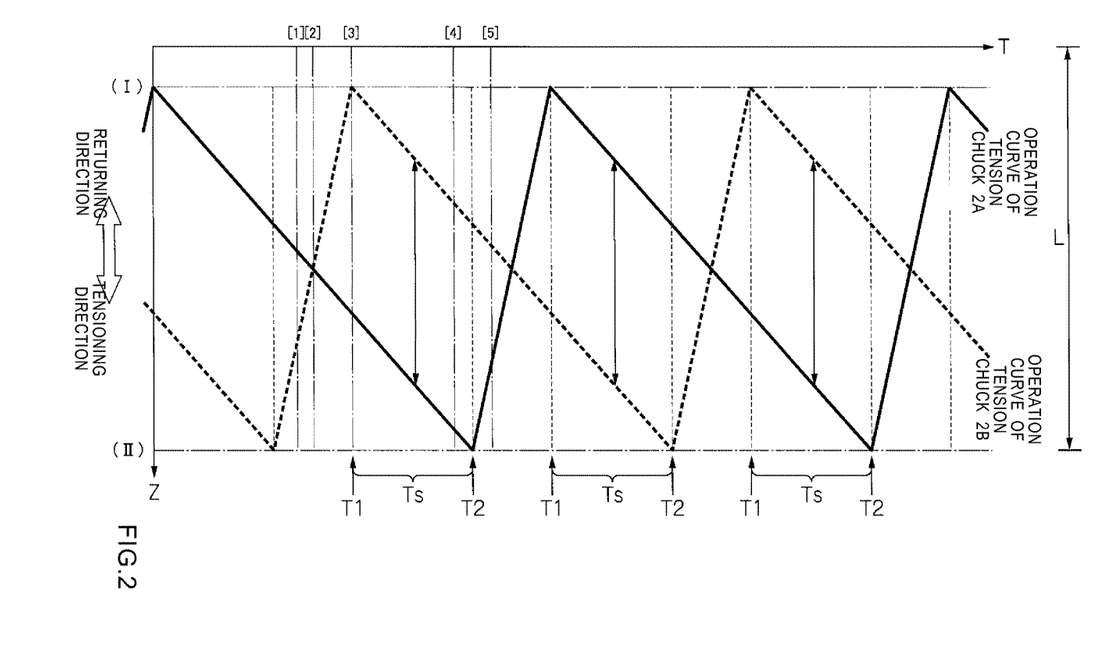
FIG. 2 is an explanatory diagram for describing a parison supply device and a parison supply method according to an embodiment of the present invention (an operation curve of a tension chuck).
Figures 3A, 3B:
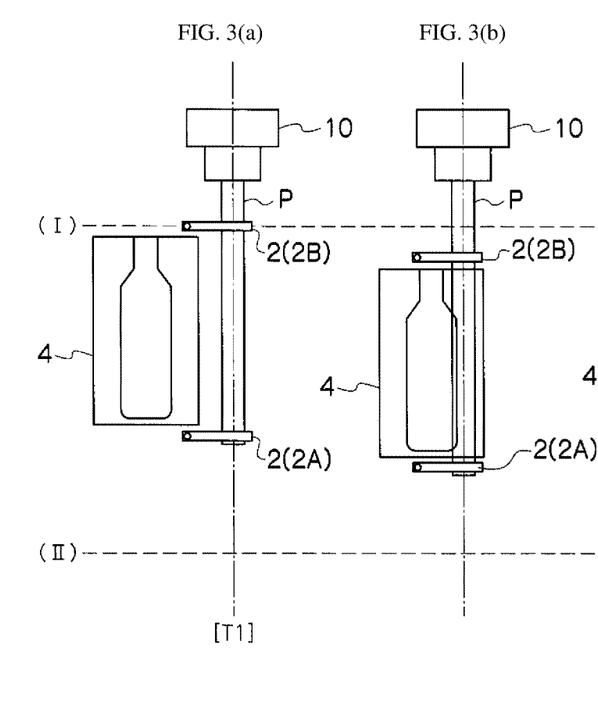
FIGS. 3(a)-3(e) are explanatory diagrams illustrating a receiving unit (a receiving method) of a parison supply device (a parison supply method) according to an embodiment of the present invention.
Figure 3C:
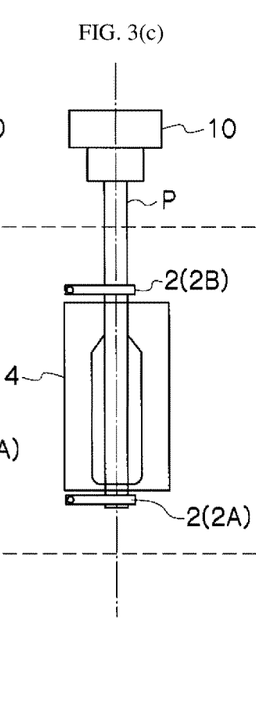
Figure 3D:
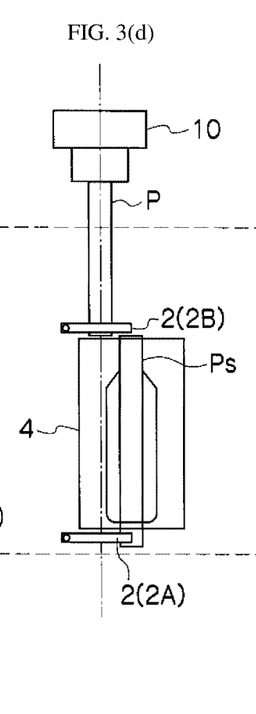
Figure 3E:
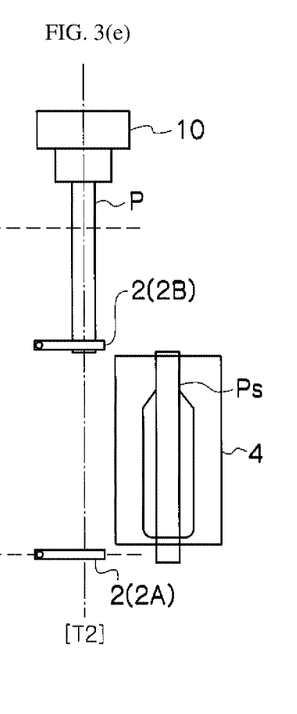
Figures 4A, 4B:
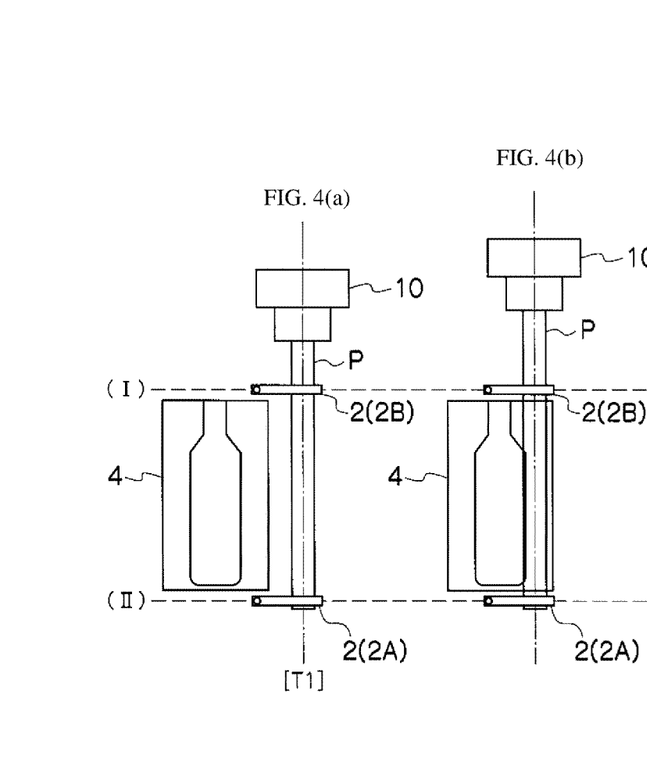
FIGS. 4(a)-4(e) are explanatory diagrams illustrating a receiving unit (a receiving method) of a parison supply device (a parison supply method) according to an embodiment of the present invention.
Figure 4C:
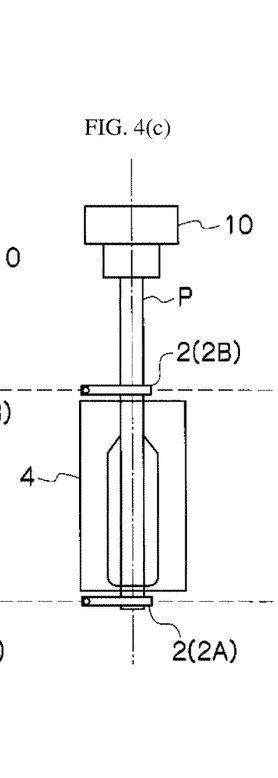
Figure 4D:
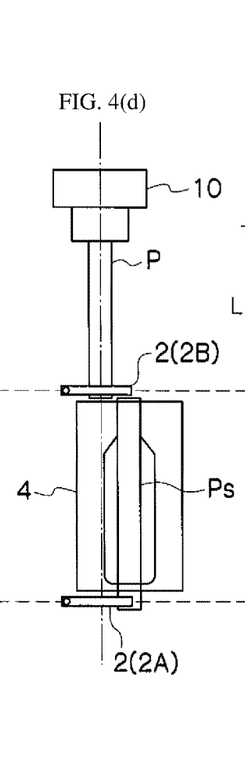
Figure 4E:
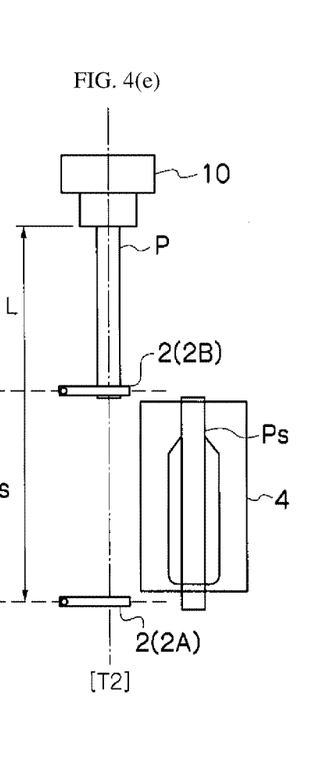

FIG. 2 is an operation curve of the tension chucks 2A and 2B illustrated in FIG. 1, in which the horizontal axis represents time T, the vertical axis represents a distance Z from the extrusion die 10, a sold line graph represents an operation curve of the tension chuck 2A, and a broken line graph represents an operation curve of the tension chuck 2B. The states at time points [1] to [5] in FIG. 2 correspond to the states (a) to (e) of FIG. 1.

In the example illustrated in FIG. 2, the tension chucks 2A and 2B move at a constant velocity in the tensioning direction, and the tensioning start timings of the tension chucks 2A and 2B are set by increasing the moving velocity in the returning direction in relation to the moving velocity in the tensioning direction. In this example, the following tension chuck 2B (2A) grasps the parison P at the first position (I) at time T1 earlier by a period Ts than time T2 at which the distance between the preceding tension chuck 2A (2B) and the extrusion die 10 reaches the set distance L at the second position (II), and after that, the preceding tension chuck 2A (2B) and the following tension chuck 2B (2A) move together while grasping the parison P.

Here, the individual tension chucks 2A and 2B operate along the same operation curves having a phase difference and apply tension while restricting the parison P constantly. During the period Ts, the preceding tension chuck 2A (2B) and the following tension chuck 2B (2A) move together so as to be separated from the extrusion die 10 while grasping the parison P. The moving velocity of the tension chuck 2A (2B) in the tensioning direction is set to be constant so that the interval between the preceding tension chuck 2A (2B) and the following tension chuck 2B (2A) is held constant during the period Ts.

A partial portion or an entire portion of the period Ts can be set as a delivery period in which an operation of cutting the parison section Ps from the parison P and delivering the same to the blow molding die is performed. By providing such a period Ts, it is possible to continuously discharge the parison P and to continuously supply the parison section Ps to the blow molding die in the delivery period set within the period Ts while restricting the parison P to apply appropriate tension.

Figures 5A, 5B, 5C:
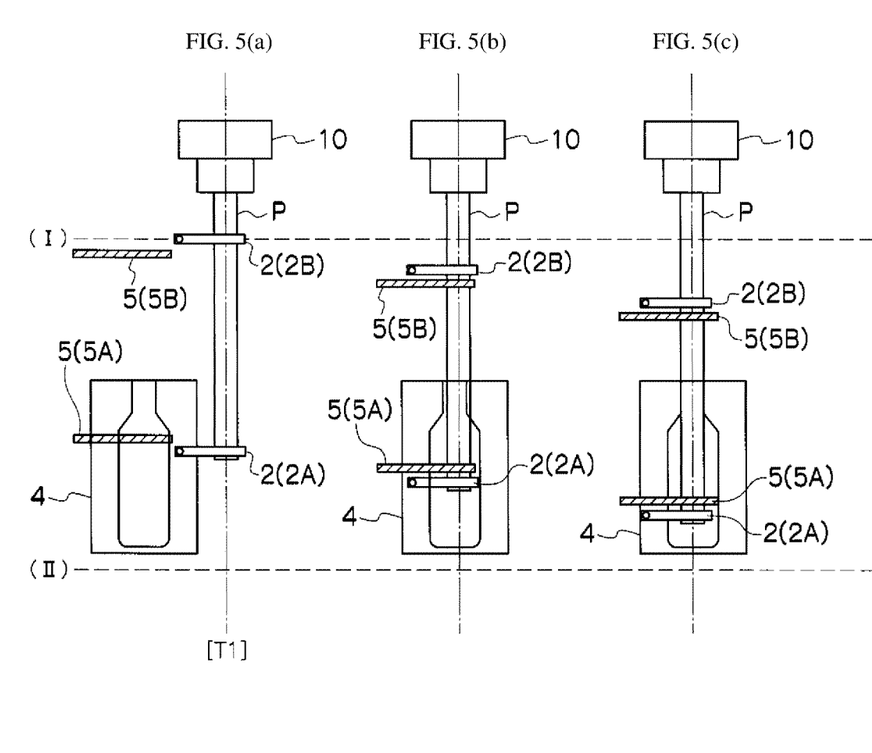
FIGS. 5(a)-5(e) are explanatory diagrams illustrating a receiving unit (a receiving method) of a parison supply device (a parison supply method) according to an embodiment of the present invention.
Figure 5D:
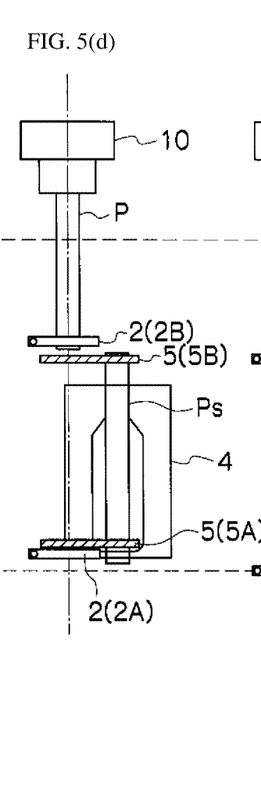
Figure 5E:
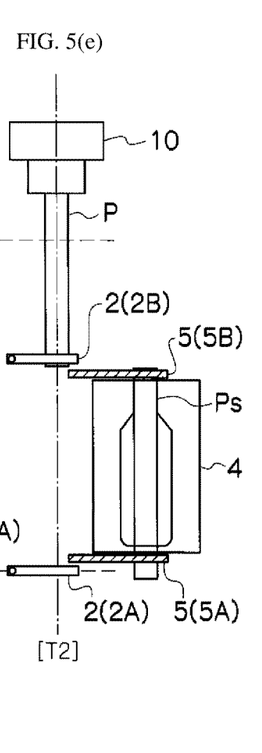

FIGS. 3 to 5 are explanatory diagrams illustrating a receiving unit (a receiving method) of the parison supply device 1 (a parison supply method) according to an embodiment of the present invention. The receiving unit is a unit that cuts the parison section Ps from the parison P and receives the parison section Ps, and as illustrated in FIGS. 3 and 4, the blow molding die itself can be used as the receiving unit. Moreover, as illustrated in FIG. 5, an additional receiving unit (for example, a pickup chuck or the like) different from the blow molding die may be provided. In any case, the receiving unit included in the parison supply device 1 according to the embodiment of the present invention is configured to receive the parison section Ps in a period (that is, the delivery period provided within the period Ts) from when the following tension chuck 2B (2A) grasps the parison P until when the preceding tension chuck 2A (2B) is separated by the set distance L from the extrusion die 10 at the second position (II).

In the example illustrated in FIG. 3, in a period (the period Ts) between an operation timing [T1] in which the following tension chuck 2B grasps the parison P at the first position (I) and an operation timing [T2] in which the preceding tension chuck 2A reaches the second position (II), as illustrated in FIGS. 3(a) to 3(e), the tension chucks 2A and 2B move together so as to be separated from the extrusion die 10 while maintaining a constant interval, and the blow molding die 4 moves from the first position (I) to the second position (II) in synchronization with the movement. As a result, a blow molding die 4 is positioned between the tension chucks 2A and 2B until the receiving operation is completed.

In the example of FIG. 3, the blow molding die 4 is configured to advance into and retract from a discharge path of the parison P. Specifically, the blow molding die 4 gradually approaches a central axis of the parison P (see FIGS. 3(a) and 3(b)) while moving downward and enters the discharge path of the parison P to receive the parison section Ps by pinching the parison P at the time at which the central axis of the blow molding die 4 matches the central axis of the parison P (see FIG. 3(c)). After that, the blow molding die 4 having received the parison section Ps is gradually separated from the central axis of the parison P while moving further downward to proceed to a blow molding step (see FIGS. 3(d) and 3(e)).

In the example illustrated in FIG. 4, in a period (the period Ts) between an operation timing [T1] in which the following tension chuck 2B grasps the parison P at the first position (I) and an operation timing [T2] in which the preceding tension chuck 2A is separated by the set distance L from the extrusion die 10 at the second position (II), as illustrated in FIGS. 4(a) to 4(e), the tension chucks 2A and 2B are held at a set position while maintaining a constant interval, and the blow molding die 4 moves horizontally so as to cross the central axis of the parison P. As a result, the blow molding die 4 is positioned between the tension chucks 2A and 2B until the receiving operation is completed. Moreover, in this period, the extrusion die 10 moves upward to gradually increase the interval between the tension chuck 2B and the extrusion die 10 so that the parison P is continuously discharged.

In the example of FIG. 4, the blow molding die 4 gradually approaches the central axis of the parison P while moving horizontally (see FIGS. 4(*a*) and 4(*b*)) to cut the parison section Ps by pinching the parison P at the time at which the central axis of the blow molding die 4 matches the central axis of the parison P (see FIG. 4(*c*)). After that, the blow molding die 4 having received the parison section Ps is gradually separated from the central axis of the parison P while moving further horizontally to proceed to a blow molding step (see FIGS. 4(*d*) and 4(*e*)).

After the state of FIG. 4(*e*) is created, the tension chuck 2B moves downward to the second position (II) and the extrusion die 10 moves downward to the position illustrated in FIG. 4(*a*). In this case, the downward moving velocity of the tension chuck 2B is set to be faster than the downward moving velocity of the extrusion die 10 by an amount corresponding to the velocity at which the extrusion die 10 is separated from the tension chuck 2B in FIGS. 4(*a*) to 4(*d*). Moreover, during the period in which the extrusion die 10 moves downward together with the tension chuck 2B, the tension chuck 2A moves to the first position (I).

In the example illustrated in FIG. 5, in a period (the period Ts) between an operation timing [T1] in which the following tension chuck 2B grasps the parison P at the first position (I) and an operation timing [T2] in which the preceding tension chuck 2A reaches the second position (II), as illustrated in FIGS. 5(*a*) to 5(*e*), the tension chucks 2A and 2B moves together so as to be separated from the extrusion die 10 while maintaining a constant interval, and the blow molding die 4 moves in a horizontal direction in synchronization with the movement. In this example, a pickup chuck 5 which is another receiving unit different from the blow molding die 4 is provided. The pickup chuck 5 includes a pair of pickup chucks 5A and 5B which are disposed to be separated from each other in the discharge direction of the parison P. The pickup chucks 5A and 5B move while being positioned between the tension chucks 2A and 2B until the receiving operation is completed by moving in synchronization with the tension chucks 2A and 2B. In the illustrated example, although the blow molding die 4 moves horizontally, the blow molding die 4 may remain stationary at a specified position.

In the example of FIG. 5, the pickup chucks 5A and 5B gradually approach the parison P while moving downward and maintaining a constant interval (see FIGS. 5(*a*) and 5(*b*)), grasps the parison P at a specified chucking position to cut and receive the parison section Ps, and delivers the parison section Ps to the blow molding die 4 (see FIGS. 5(*c*) and 5(*d*)). After that, the pickup chucks 5A and 5B are gradually separated from the central axis of the parison P while moving further downward, and the blow molding die 4 to which the parison section Ps is supplied proceeds to a blow molding step (see FIGS. 5(*d*) and 5(*e*)). In the illustrated example, the pickup chucks 5A and 5B move in synchronization with the tension chucks 2A and 2B and move in synchronization with the blow molding die 4. As a result, the received parison section Ps can be delivered to the blow molding die 4 efficiently with a minimum necessary movement amount.

After the parison section Ps is received, the pickup chucks 5A and 5B are moved in relation to each other, whereby the parison section Ps can be subjected to secondary processing. For example, the pickup chucks may be separated in parallel to the extruding direction so that the parison section Ps is further stretched, the pickup chucks may be shifted in a direction vertical to the extruding direction so that the parison section Ps is disposed (tensioned) obliquely, or the parison section Ps may be rotated about the extruding direction so that the parison section Ps is twisted.

According to the parison supply device 1 according to the embodiment of the present invention or a parison supply method which uses the parison supply device 1, by alternately operating the plurality of tension chucks 2 (individual tension chucks 2A and 2B), it is possible to restrict the parison P discharged from the extrusion die 10 constantly and apply linear tension. Due to this, even when the parison P is discharged vertically downward, it is possible to suppress a thickness variation resulting from draw-down and to apply appropriate tension of which the direction and velocity do not change to supply the parison P to the blow molding die 4 while maintaining the tension state. As described above, according to the parison supply device 1 and the parison supply method according to the embodiment of the present invention, the high-quality parison section Ps in which the thickness uniformity is high and a molecular alignment state or the like is excellent can be supplied to the blow molding die 4.

Moreover, according to the parison supply device 1 or the parison supply method according to the embodiment of the present invention, in the process of continuously discharging the parison P from the extrusion die 10, a delivery period Ts which maintains a state in which the parison P is grasped by the pair of tension chucks 2A and 2B while maintaining a state of applying appropriate tension to the parison P is provided. Since such a delivery period is secured while applying appropriate tension to the parison P, high-quality parison sections Ps can be continuously supplied to the blow molding die 4.

Since the parison supply device 1 includes another receiving unit different from the blow molding die 4 like the pickup chuck 5, the parison section Ps can be received by the pair of pickup chucks 5A and 5B and delivered to the blow molding die 4, it is possible to stop or simplify the movement of the blow molding die 4 and the extrusion die 10 independently from the movement of the tension chuck 2. Moreover, by arbitrarily setting the operation of the pair of pickup chucks 5A and 5B, high-quality parison sections Ps can be supplied in various transport types (horizontal rotary type, shuttle type, vertical rotary type, and the like) of the blow molding die 4. In this case, since the parison P which is constantly restricted and tensioned can be received while maintaining appropriate tension without releasing the restriction by the pickup chuck 5 and be transported to the blow molding die 4, it is possible to prevent sagging or shaking of the parison section Ps and to supply the parison section Ps in a stable state.

In the embodiment described above, although an example in which the moving velocity of the tension chuck 2 in the tensioning direction is constantly constant has been illustrated, the tension state of the parison section Ps supplied to the blow molding die 4 can be changed to a desired state by changing the moving velocity of the tension chuck 2 in the tensioning direction as a modified example. As an example, the tension chuck operation unit 3 performs an operation of changing the moving velocity of the preceding tension chuck 2A (2B) after the following tension chuck 2B (2A) grasps the parison P.

The pickup chuck 5 and the tension chuck 2 may be integrated, and the tension chuck operation unit 3 may perform an operation of grasping and tensioning the parison and supplying the parison to the mold.

Figure 6:
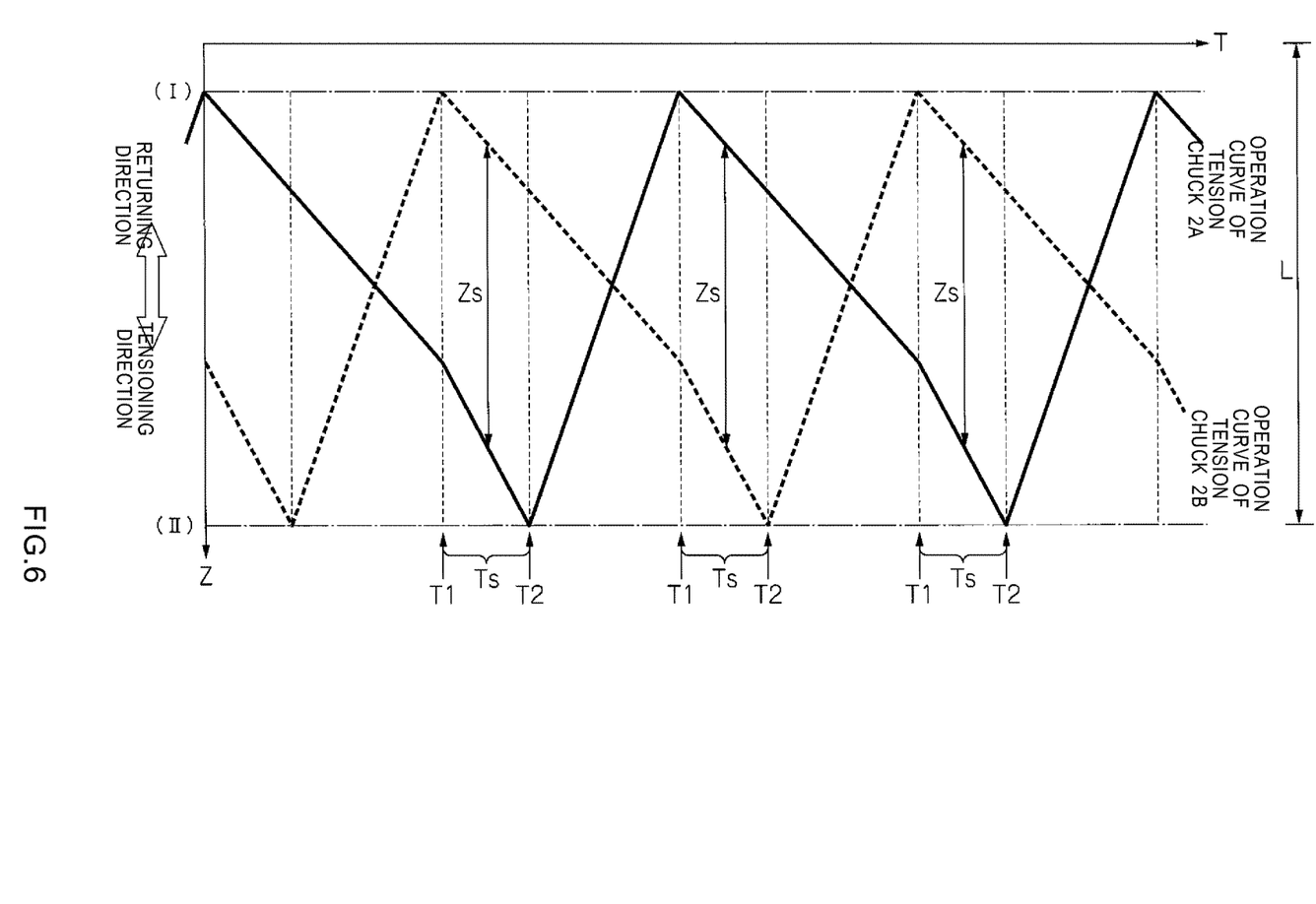
FIG. 6 is an explanatory diagram illustrating a modified example of a parison supply device (a parison supply method) according to an embodiment of the present invention (an operation curve of a tension chuck).

FIG. 6 illustrates an operation curve of the tension chuck according to the modified example. Like FIG. 2, the horizontal axis represents time T, the vertical axis represents a distance Z from the extrusion die 10, a sold line graph represents an operation curve of the tension chuck 2A, and a broken line graph represents an operation curve of the tension chuck 2B. In this modified example, similarly to the above-described embodiment, the following tension chuck 2B (2A) grasps the parison P at the first position (I) at time T1 earlier by a period Ts than time T2 at which the distance between the preceding tension chuck 2A (2B) and the extrusion die 10 reaches the set distance L at the second position (II), and after that, the preceding tension chuck 2A (2B) and the following tension chuck 2B (2A) move together while grasping the parison P.

In this modified example, the tension state of the parison P is changed by changing the moving velocity of the tension chucks 2A and 2B in the tensioning direction during the movement so that the moving velocity after time T1 is faster than the moving velocity before time T1. In this example, after the preceding tension chuck 2A (2B) and the following tension chuck 2B (2A) grasp the parison P, the interval Zs between the tension chucks 2A and 2B is gradually increased to apply higher tensile force.

The parison supply device 1 according to the embodiment of the present invention can be applied to various types of blow molding machines by employing the receiving unit such as the pickup chuck 5. In particular, advantageous effects can be obtained by applying the parison supply device 1 to a horizontal rotary or shuttle-type blow molding machine. A horizontal rotary or shuttle-type blow molding machine includes a molding die transport unit (a molding die turret) that transports a blow molding die in a direction (horizontal direction) crossing the discharge direction (vertical direction) of the parison P.

In general, according to a vertical rotary-type blow molding machine, an entire length of a molding die is determined according to the number of molding dies disposed in one molding die turret that rotates vertically. The vertical rotary-type blow molding machine has a drawback that, even when the height of a molded product is low, it is not possible to change the length of a parison section supplied to one molding die and to obtain a molded product with high yield from a parison discharged from an extrusion die. In contrast, according to a horizontal rotary or shuttle-type blow molding machine, the height of a molding die can be set regardless of the number of molding dies disposed in a molding die turret or the like. Thus, it is possible to obtain high yield by supplying the parison section according to the height of the molding die. However, since a conventional horizontal rotary or shuttle-type blow molding machine supplies a parison extruded in a vertical direction to a molding die transported in a horizontal direction, it was difficult to supply the parison continuously.

In contrast, a horizontal rotary or shuttle-type blow molding machine to which the parison supply device 1 according to the embodiment of the present invention is applied can continuously supply parisons using the delivery period of Ts. Due to this, it is possible to obtain high-quality molded products by supplying high-quality parison sections as described above and to provide a highly productive blow molding machine with high yield.

While embodiments of the present invention have been described in detail with reference to the drawings, a specific configuration is not limited to these embodiments, and the present invention encompasses changes in design made without departing from the spirit and scope of the present invention. Moreover, the respective embodiments described above can be combined with each other by taking advantage of mutual techniques unless specific contradictions or problems are found in the objects, the configurations, and the like.

REFERENCE SIGNS LIST

1: Parison supply device
2(2A, 2B): Tension chuck
3: Tension chuck operation unit
4: Blow molding die
5(5A, 5B): Pickup chuck
10: Extrusion die
P: Parison
Ps: Parison section

What is claimed is:

1. A parison supply device that continuously supplies, to a blow molding die, a parison section of a parison discharged from an extrusion die, the parison section having a specified length, the parison supply device comprising:
   a plurality of tension chucks grasping the parison and pulling the parison in a discharge direction of the parison between the extrusion die and the tension chuck; and
   a tension chuck operation unit that operates a plurality of the tension chucks, wherein
   the tension chuck operation unit causes each of the tension chucks to perform a repeated operation of grasping the parison at a first position near the extrusion die and moving to a second position, separated from the extrusion die farther than the first position such that, before a preceding one of the tension chucks is separated by a set distance from the extrusion die at the second position, a following one of the tension chucks grasps the parison at the first position, and then the parison section is supplied to the blow molding die.

2. The parison supply device according to claim 1, wherein
   the tension chuck operation unit moves the tension chucks at a constant velocity from the first position to the second position.

3. The parison supply device according to claim 1, wherein
   the tension chuck operation unit changes a moving velocity of the tension chuck which is preceding after the tension chuck which is following grasps the parison.

4. The parison supply device according to claim 1, comprising:
   a receiving unit that receives the parison section, wherein the receiving unit receives the parison section in a period from when the tension chuck which is following grasps the parison until when the tension chuck which is preceding is separated by the set distance from the extrusion die at the second position.

5. The parison supply device according to claim 4, wherein
   the receiving unit moves while being positioned between the tension chuck which is preceding and the tension chuck which is following until a receiving operation is completed.

6. The parison supply device according to claim 4, wherein the receiving unit is a pair of pickup chucks that are separated from each other in the discharge direction of the parison and is configured to grasp and receive the parison section and deliver the parison section to the blow molding die.

7. The parison supply device according to claim 4, wherein the receiving unit is a blow molding die configured to advance into and retract from a discharge path of the parison and is configured to enter the discharge path of the parison to receive the parison section.

8. A blow molding machine comprising:
the parison supply device according to claim 1; and
a transport unit that transports the blow molding die in a direction crossing the discharge direction of the parison.

9. The parison supply device according to claim 5, wherein
the receiving unit is a pair of pickup chucks that are separated from each other in the discharge direction of the parison and is configured to grasp and receive the parison section and deliver the parison section to the blow molding die.

10. The parison supply device according to claim 5, wherein
the receiving unit is a blow molding die configured to advance into and retract from a discharge path of the parison and is configured to enter the discharge path of the parison to receive the parison section.

11. A blow molding machine comprising:
the parison supply device according to claim 4; and
a transport unit that transports the blow molding die in a direction crossing the discharge direction of the parison.

12. A blow molding machine comprising:
the parison supply device according to claim 5; and
a transport unit that transports the blow molding die in a direction crossing the discharge direction of the parison.

13. A blow molding machine comprising:
the parison supply device according to claim 6; and
a transport unit that transports the blow molding die in a direction crossing the discharge direction of the parison.

14. A blow molding machine comprising:
the parison supply device according to claim 7; and
a transport unit that transports the blow molding die in a direction crossing the discharge direction of the parison.

15. A blow molding machine comprising:
the parison supply device according to claim 9; and
a transport unit that transports the blow molding die in a direction crossing the discharge direction of the parison.

16. A blow molding machine comprising:
the parison supply device according to claim 10; and
a transport unit that transports the blow molding die in a direction crossing the discharge direction of the parison.

17. A parison supply method of continuously supplying, to a blow molding die, a parison section of a parison discharged from an extrusion die, the parison section having a specified length, wherein
a plurality of tension chucks grasping the parison and pulling the parison in a discharge direction of the parison between the extrusion die and the tension chuck is included,
each of the tension chucks perform a repeated operation of grasping a parison at a first position near the extrusion die and moving to a second position, separated from the extrusion die farther than the first position and before a preceding one of the tension chucks is separated by a set distance from the extrusion die at the second position, a following one of the tension chucks grasps the parison at the first position, and then the parison section is supplied to the blow molding die.

18. The parison supply method according to claim 17, wherein
a delivery period in which the tension chuck which is preceding and the tension chuck which is following are separated from the extrusion die while grasping the parison is provided.

19. The parison supply method according to claim 18, wherein
an interval between the tension chuck which is preceding and the tension chuck which is following is held constant in the delivery period.

* * * * *